No. 843,030. PATENTED FEB. 5, 1907.
R. E. POINDEXTER.
SAW.
APPLICATION FILED SEPT. 7, 1906.
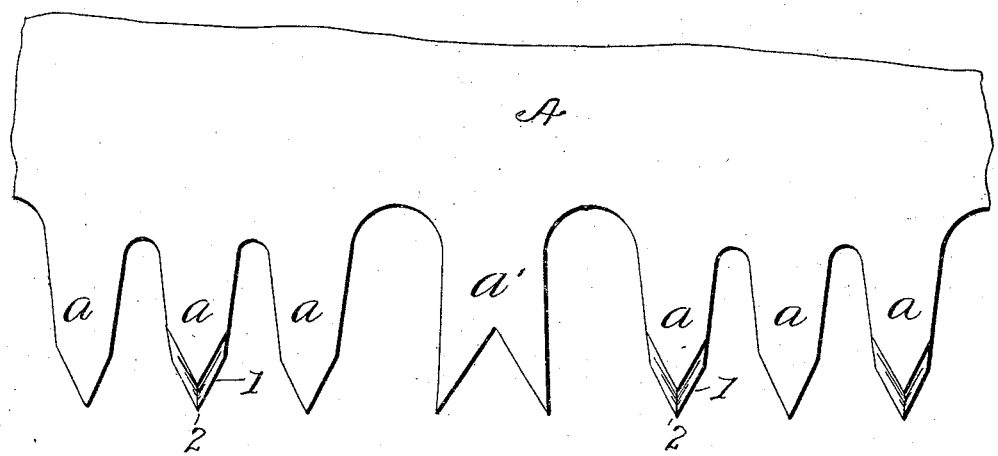
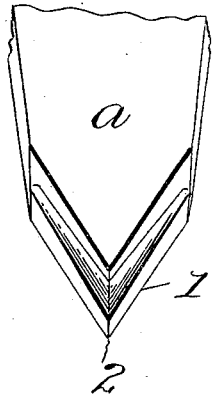
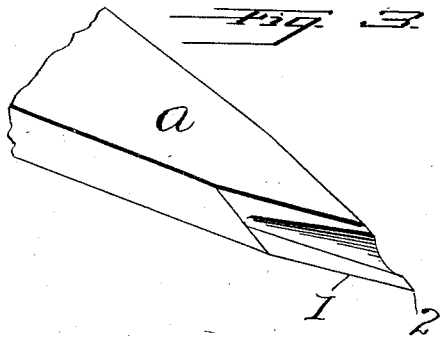
Witnesses
Chas. K. Davies.
M. H. Darg
Inventor
Robert E. Poindexter,
By E. W. Bradford
Attorney

UNITED STATES PATENT OFFICE.

ROBERT E. POINDEXTER, OF INDIANAPOLIS, INDIANA.

SAW.

No. 843,030.  Specification of Letters Patent.  Patented Feb. 5, 1907.

Application filed September 7, 1906. Serial No. 333,651.

*To all whom it may concern:*

Be it known that I, ROBERT E. POINDEXTER, a citizen of the United States, residing at Indianapolis, in the county of Marion and State of Indiana, have invented certain new and useful Improvements in Saws, of which the following is a specification.

My said invention consists in an improved form of saw-tooth whereby the cutting edge of the tooth is made thinner than the ordinary form of tooth, while its strength is not materially impaired, thereby securing a tooth which is susceptible of making a very rapid cut and at the same time be able to withstand the strain of heavy work, all as will be hereinafter more fully described and claimed.

Referring to the accompanying drawings, which are made a part hereof, Figure 1 is a section of a crosscut-saw, the cutting-teeth of which are of my improved form; and Figs. 2 and 3 are detail perspective views of one of the cutting-teeth in different positions, on an exaggerated scale, to illustrate the particular form of tooth constituting the invention more clearly.

The saw A is or may be of any character, that shown being a section of a crosscut-saw having cutting-teeth a arranged in sections of three teeth to each section, with a racking-tooth a' between the several sections of cutting-teeth. This construction, however, it will be understood, is shown to illustrate the form of tooth in connection with some form of saw, but not necessarily to limit the invention to such a saw.

Each cutting-tooth a is provided with a beveled cutting-point of the usual or any approved general form, with a bevel on each side of the tapered point. Said bevel is first formed with flat faces and then concaved by means of a small round file or other instrument, as shown most clearly in Figs. 2 and 3, the concaved portion extending nearly the entire length of the beveled portion of the tooth, but not to the extreme cutting edge 1 on point 2, which edge and point are left of the same angle as if the concavity was not formed in the face thereof. Other means or methods may be employed to secure the result, as will be readily understood, the invention residing in the shape of the tooth. The strength of the point and edge of the tooth is thus left unimpaired, while the metal taken out by the concavity renders the cutting portion of the tooth thinner and enables it to cut more rapidly than the old form of saw.

Having thus fully described my said invention, what I claim as new, and desire to secure by Letters Patent, is—

1. A saw provided with a cutting-tooth having a beveled point, the face of said bevel being concaved to the angle of the bevel but not to the point of the tooth, substantially as set forth.

2. A saw provided with cutting-teeth formed with their points beveled on each side, the face of each bevel being formed concaved from points near the cutting edge and points of the teeth to near the opposite side of the bevel and extending lengthwise of said bevel, substantially as set forth.

3. A saw-tooth with a beveled cutting-point, the bevel of which is formed concaved, substantially as set forth.

In witness whereof I have hereunto set my hand and seal, at Indianapolis, Indiana, this 5th day of September, A. D. 1906.

ROBERT E. POINDEXTER. [L. S.]

Witnesses:
E. J. HICKS,
H. O. WADDY.